Sept. 6, 1966 J. D. SPERRY ET AL 3,270,975

INCHING DEVICE FOR A REEL

Filed Aug. 23, 1963 3 Sheets-Sheet 1

JOHN D. SPERRY &
MARTIN SIEGEL
INVENTORS

BY Robert S. Clay

ATTORNEY

JOHN D. SPERRY &
MARTIN SIEGEL
INVENTORS

BY Robert G. Clay

ATTORNEY

JOHN D. SPERRY &
MARTIN SIEGEL
INVENTORS

BY Robert G. Clay

ATTORNEY

United States Patent Office 3,270,975
Patented Sept. 6, 1966

3,270,975

INCHING DEVICE FOR A REEL

John D. Sperry, Los Altos, and Martin Siegel, San Mateo, Calif., assignors to Ampex Corporation, Redwood City, Calif., a corporation of California Filed Aug. 23, 1963, Ser. No. 304,111
5 Claims. (Cl. 242—75.4)

This invention relates to magnetic tape transports, and particularly to devices for causing incremental movement of the reels thereof.

Previously, magnetic tape transports have used brakes for stopping the reels at the end of operation and for holding the reels in a desired stop or "parking" condition; and also during operation for creating a drag on the supply reel to tension the tape. Such systems have usually included friction brakes, but in some, the braking effect has been created by energizing the reel motors in a direction to resist the motion of the tape.

In broad band helical scan transports, such as are used for television signal recording and reproducing, a problem arises in that if stopping and parking brakes are used in the customary way, the tape is brought to a halt in tensioned condition around the helical scanning guide, and in frictional contact with the rotating heads thereof. If the halt is made at the end of a period of operation, the heads quickly stop, and no appreciable damage is done. However, if the halt is made only as a temporary pause in operation (i.e., with the transport in "standby" mode), the heads must be maintained in their rapidly rotating mode, and the track of the tape that is traversed by the heads is worn away. Under such conditions, the oxide surface of the tape can be ruined in about thirty seconds, and the tape track is useless for further reproduction or recording.

Accordingly, it is an object of this invention to provide for a rotating head tape transport, a device that ensures survival of the tape when the tape is stopped while the heads are rotating.

It is another object of the invention to provide a device that operates to loosen the tape around a rotating head scanning assembly when the transport is in a standby mode.

It is a further object of the invention to provide a pair of reel parking brakes functioning as above described and also operable as reel stopping brakes in an emergency.

These and other objects of the invention are attained in a structure in which the reels are brought to a halt by operation of reel drive motors or stopping brakes such as are known in the art, and the brakes of the invention are then applied in such as way as first to induce a limited "inching" or differential movement of the reels (i.e., each in the unwinding direction) to slacken the tape therebetween, and then to lock the reels in their now positions for the duration of the halt. Thus the slackened tape is kept out of tensioned frictional engagement with the rotating heads of the scanning assembly during the halt, but the reels are locked against unlimited loosening of the tape, so that tangling is avoided, and so that the tape is held ready for immediate resumption of operation. The parking brakes are also constructed so as to be operable as "fail-safe" stopping brakes in the event of power failure.

A better understanding of the invention may be had by reference to the following description, taken in conjunction with the accompanying drawings, in which.

Figure 1:
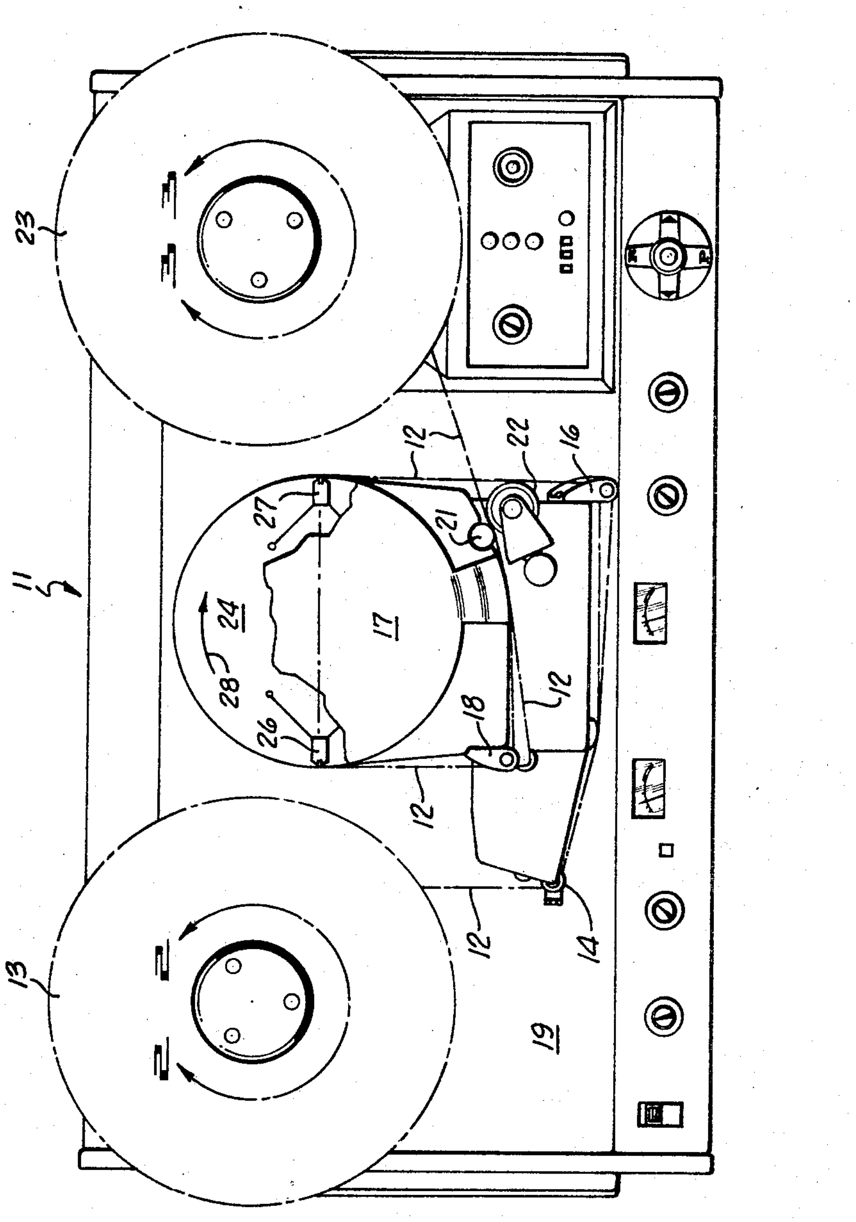
FIGURE 1 is a plan of a tape transport incorporating the invention.

Referring now to the drawings and particularly to FIGURE 1 thereof, there is shown a magnetic tape television recording and reproducing apparatus 11 to which the invention is to be applied as later described. The apparatus 11 is of a type in which a tape 12 is fed from a supply reel 13 and around a tape tension sensing arm 14 and to an angled guide 16, all in one plane. From the guide 16 the tape is guided in an inclined path upward (i.e.; out of the paper) and in a helical half turn around a cylindrical scanning assembly 17. The tape continues on an upward inclined path to a second angled guide 18 and from thence is directed in a plane parallel to the first and to the top plate 19 of the machine, to a rotating capstan 21 and pinch roller 22, and to a takeup reel 23. As shown in the figure, the upper portion of the scanning assembly 17 is broken away to reveal a rotating head drum 24 on which is mounted a pair of rotating heads 26 and 27 moving in the direction of arrows 28. Each of these heads in turn sweeps the tape through a 180-degree arc; and because the tape is following a helical path, the track that is traced on the tape by each head during the recording process is a diagonal track completely crossing the tape.

It will be understood that in normal operation of such a machine, the tape is constantly moving in the longitudinal direction so that each time that one of the heads sweeps the tape, the track that is swept is separate and is spaced from the preceding and following tracks by a small distance. The frictional engagement of the head against the opposite surface of the tape causes some wear thereof, but since no individual track is swept more than once during a single playing of the tape, the tape can be recorded upon and replayed many times before the oxide surface becomes so worn as to be no longer usable. When, however, the tape is to be stopped for a few minutes with the intention of resuming the operation of the machine, it is usually preferred to keep the head drum 24 rotating so as to be ready and moving at the correct speed for the resumption of operation. This action is dictated partly by the fact that the drum has a substantial inertial and is usually built in the form of a fly-wheel, or has a fly-wheel coupled thereto, to stabilize its rotational speed. Clearly, to repeatedly top and re-start the drum each time the machine is temporarily stopped would be inconvenient and impractical. The problem that arises with the tape is that when the drum 24 is still rotating at its operational speed while the tape 12 is standing still, the heads 26 and 27 repeatedly sweep the same track of the tape, causing excessive wear of the oxide surface thereof. As previously pointed out the oxide surface can in this way be spoiled for further use in so short a time as thirty seconds.

In prior art machines, such destructive frictional engagement of the tape with the rotating heads is unavoidable if the heads are not stopped, because the braking arrangements for such machines maintain the tension of the tape even when it is standing still, thus causing the tape to tightly hug the scanning assembly. Such prior art machines have stopping brakes that remain engaged after the reels are stopped in order to prevent accidental or undesired loosening of the tape between the reels to such an extend that loops of tape are thrown to become entangled in the apparatus or to result in tape-damaging jerks when the tape is restarted. It is of course desirable to positively limit the looseness of the tape when the reels are stationary, but the present invention as below described accomplishes this end without at the same time keeping the tape taut around the scanning assembly 17.

Figure 2:
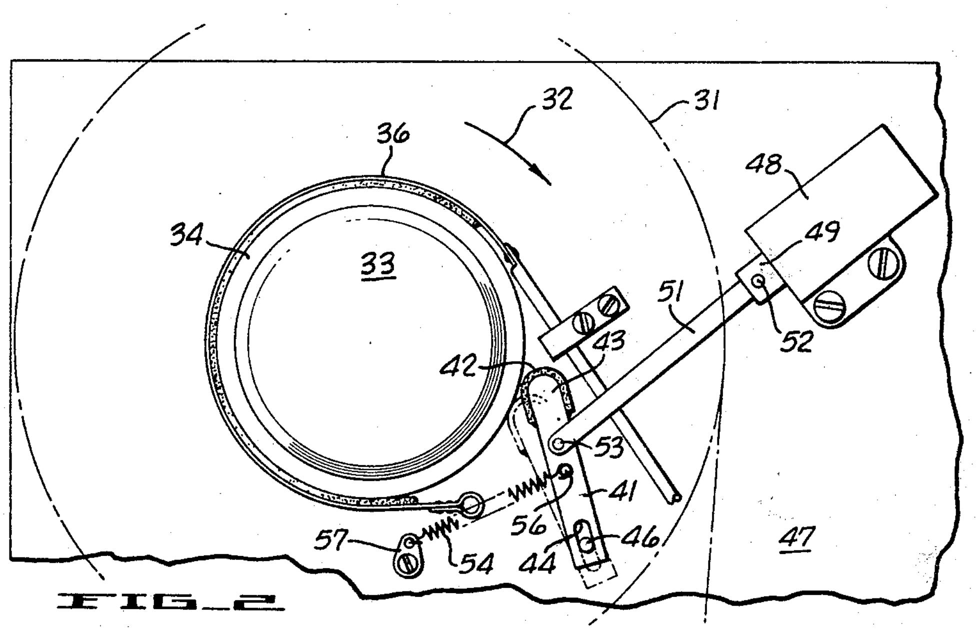
FIGURE 2 is an enlarged broken away plan of a portion of the apparatus enclosed within lines 2—2 of FIGURE 1.
Figure 3:
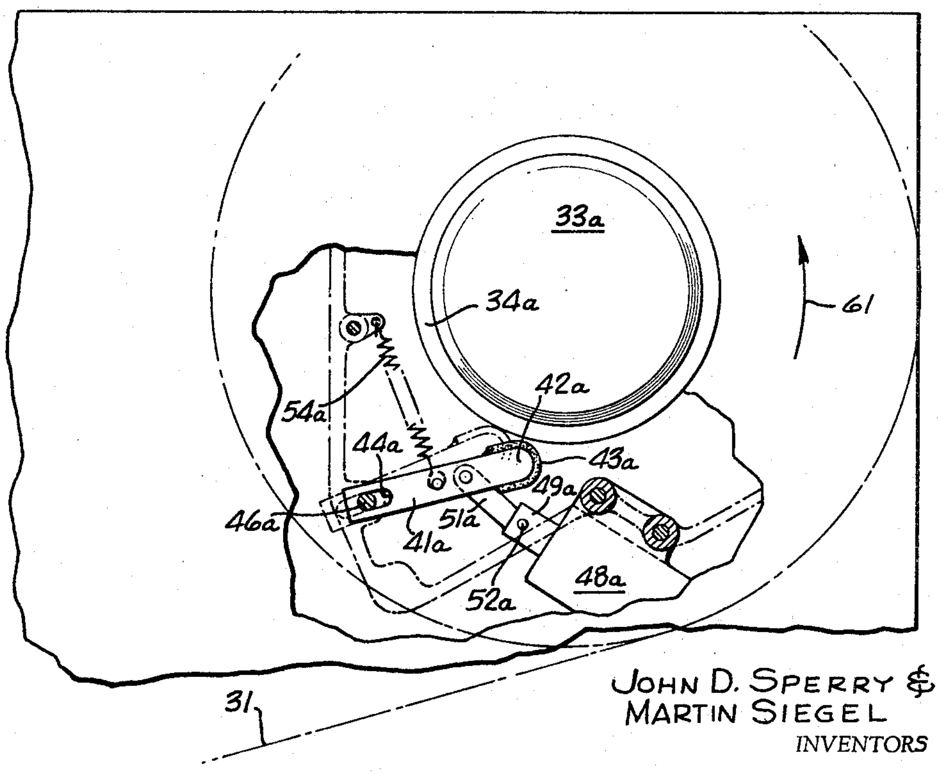
FIGURE 3 is an enlarged broken away plan of a portion of the apparatus enclosed within lines 3—3 of FIGURE 1.

Referring now to FIGURES 2 and 3, the "parking" brakes of the present invention are shown in relation to the supply reel 13 (FIGURE 2) and the takeup reel 23 (FIGURE 3) since these brakes are essentially similar, the supply reel brake of FIGURE 2 will be described first.

It should be noted that the supply reel 13 and the tape pack 31 mounted thereon are rotated in a clockwise direction illustrated by the arrow 32 when the tape is being drawn therefrom. The reel 31 is mounted on a hub 33, which is coupled to a brake drum 34. A band brake 36, which is not the brake of the present invention, engages the drum 34, and is coupled to the sensing arm 14 for maintaining the tension of the tape during active operation. This brake 36 is not used for stopping the reel 31, and is completely disengaged by means, not here shown, during the stopping process. In the illustrated transport, stopping of the reel is ordinarily accomplished by reverse energization of the supply reel motor (not shown), and a motion sensing device (not shown) is associated with the reel to de-energize the supply reel motor at the instant the supply reel comes to a true stop. Thus at the instant of stopping, the supply reel is substantially motionless and has substantially no forces acting on it either to induce it to continue rotating or to induce it to stand still. It is at this instant that the parking brake of the invention is applied.

As shown in the figure, the parking brake includes a brake arm 41 having a rounded end 42 covered with a layer of frictional wear resistant material 43. The arm 41 has an elongated slot 44 in the other end, by which it is mounted for pivoting and longitudinal sliding motion on a pivot pin 46, the pin 46 being affixed to a mounting plate 47 forming part of the framework of the transport. A solenoid 48, also mounted on the mounting plate 47, has a plunger 49 to which is secured a pivoting link member 51 as by a pin 52. The other end of the link member 51 is attached to the arm 41 as by means of a pin 53. The solenoid 48 is energized during normal operation of the machine, and the solenoid 48 and link member 51 are positioned at such an angle to the length of the arm 41, that when energized, the solenoid holds the arm 41 just clear of the brake drum 34, and with the pivot pin 46 engaging the end of the slot 44 that is farthest away from the drum 34. At the instant of stopping of the reel 31, the motion sensing device previously referred to, which interrupts the current to the reel motors, also de-energizes the solenoid 48, and the brake arm 41 is released for engagement with the brake drum 34.

To effect engagement of the brake arm 41, a tension spring 54 is provided, one end being coupled to a pin 56 on the arm 41, and the other end being coupled to an anchor post 57 extending from the mounting plate 47. The axis of the spring 54 is inclined to the arm 41 at such an angle that, upon release of the solenoid 48 the arm 41 is pivoted around the pin 46 to immediately engage the frictional material 43 with the brake drum 34. The tension of the spring thereafter causes continuing movement of the arm 41 in both longitudinal sliding and pivoting motion with respect to the pin 46 so that the brake drum 34 is rotated about half an inch in a clockwise direction. The end of this movement comes when the pivot pin 46 comes into engagement with the end of the slot 44 that is closest to the brake drum 34. Thereafter, the spring maintains the arm 41 in stationary braking engagement with the drum 34.

It will be seen that the clockwise direction described above is the unwinding direction of the tape pack 31, and that the movement of the reel that is induced by the spring 54 tends to add about half an inch of slack to the tape segment between the reels and engaging the scanning assembly 17; and it will also be seen that after this "inching" process is completed, the brake 41 remains in frictional braking engagement with the drum 34 so as to operate effectively as a parking brake, preventing further loosening of the tape between the reels. It should be particularly noted that the brake arm 41 is inclined to a radius of the drum 34 running through the pin 46, and that the direction of inclination is toward the winding direction of motion of the reel 13 (i.e., counter-clockwise). Thus when the reel is stopped and the arm 41 is in its final braking position illustrated in phantom in the figure, any further pull applied to the tape 12 tends to cause the brake arm 41 to wedge or jam against the brake drum 34 and to increase its frictional braking force thereon in what is known as a "self-energizing" manner.

Referring now to FIGURE 3, the takeup reel brake arm 41*a* and associated apparatus is illustrated. The arm 41*a* also has a rounded end 42*a*, a frictional braking layer 43*a*, a slot 44*a*, a pivot pin 46*a*, a solenoid 48*a*, and a tension spring 54*a* arranged and operated substantially the same as the corresponding elements that were shown in FIGURE 2. In particular, it should be noted that the arm 41*a* is inclined to a radius of the takeup reel brake drum 43*a* extending to the pin 46*a*, and that the direction of inclination is in the winding direction 61 of the takeup reel 23. It should be noted that the tape comes from the supply reel 13 travelling in a clockwise direction and thus onto the takeup reel 23 travelling in a counter-clockwise direction, these directions being respectively the "unwinding" direction of the supply reel and the "winding" direction of the takeup reel. Consequently when the reels are brought to a halt by the reel motors, and when the reel motors are de-energized along with the solenoids 48 and 48*a* by the motion sensing device previously mentioned, the brake arm 41*a* is drawn by its spring 54*a* first into pivoting frictional engagement with the brake drum 34*a*, and then in combined pivoting and longitudinal sliding motion on the pin 46*a* to rotate the takeup reel about half an inch in the clockwise or unwinding direction. Thus the takeup reel is also caused to feed about half an inch of slack tape into the loop around the scanning assembly 17.

As previously noted, the brakes 41 and 41*a* are not ordinarily used for stopping the reels, but in the event of power failure during normal operation of the machine, the brakes 41, 41*a* do operate effectively to differentially stop the reels. It is noted that in the event of such power failure, neither the brake band 36, nor the reel motors would be available to effect stopping of the reels. However, the same power failure would release the solenoids 48 and 48*a* so that the arms 41 and 41*a* are instantly engaged against their respective brake drums. As in all stopping brakes, it is desirable to have the brake that is operating on the supply reel exert a greater braking force than the brake that is acting on the takeup reel in order to prevent undue slack of the tape between the reels, to become entangled in the apparatus. It will be seen however that when the tape is moving in the normal forward direction, the brake arm 41 on the supply reel is inclined to the drum 34 in the correct direction to be self-energizing and to exert a greater braking force than the arm 41*a*, which is inclined to the drum 34*a* in the direction of movement of the drum and is therefore not self-energizing. Conversely when the tape is moving in a reverse direction and the power fails, it is the brake 41*a* that is self-energizing and exerts a greater braking force than the brake 41. In both cases, the brake that is associated with the reel that is supplying tape (i.e.; brake 41 and reel 13 in a forward direction, and brake 41*a* and reel 23 in a reverse direction) in becoming self-energizing is jammed down on the respective pivot pin in such a way as to lose its ability to inch slack into the tape loop after the reels have stopped. However in both cases, the brake that is associated with the reel that is taking up tape (the brake 41*a* and reel 23 in the forward direction and the brake 41 and reel 13 in the reverse direction) is maintained in its pre-inching position during the stopping process, and after the reels have stopped, still operates to inch the respective reel in an unwinding direction to provide at least half an inch of slack around the scanning assembly 17. Thus some slack is provided even when there is power failure, and the destructive effect of the heads 26 on the tape is further decreased by the fact that a power failure also interrupts the current to the motor driving the head drum 24, and the heads 26, 27 gradually come to a stop.

It will be apparent from the above description that the principles set forth may be embodied in other types of brakes, including band brakes and disc brakes.

Now it will be understood that in the operation of the brakes for the above described inching process, the angles at which the forces of the solenoids and springs are applied to the arms 41 and 41*a* have a critical range. For example in FIGURE 2, if the spring 54 were pulling from the pin 56 toward the axis of the brake drum 34, then the brake would be engaged with drum 34 upon release by the solenoid 48, but the arm 41 would not be urged to slide to the right upon the pin 46, and the reel 13 would not be inched in an upwinding direction to provide the slack needed in the tape. The limiting conditions under which the spring 54 is effective to provide inching are illustrated in FIGURE 4.

Figure 4:
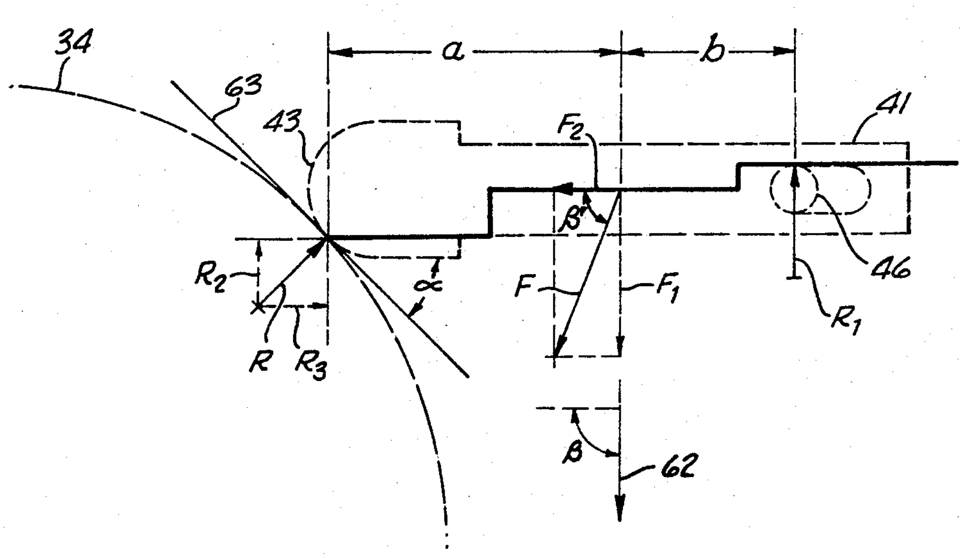
FIGURE 4 is a schematic view illustrating the operation of the apparatus of FIGURE 2.

In FIGURE 4, the arm 41 is shown in phantom, and is represented by a schematic beam 61. First, the equilibrium condition of the beam is determined. This condition obtains when the beam 61 will slide neither to the right nor to the left on pin 46 even though it may be free to do so, i.e., when the spring force F of spring 54 pulls in the direction shown in the figure, making with the beam an angle $\beta'$ that opens toward the drum 34, the angle $\beta'$ being such that the spring force component $F_2$ parallel to beam 61 is equal and opposite to the component $R_3$, parallel to the beam, of the reaction force R that acts on the beam from the drum 34. The value of equilibrium angle $\beta'$ is derived from the following equations that must obtain in the equilibrium condition:

$$(1)\quad F_2=R_3$$
$$(2)\quad F_1=R_1+R_2$$
$$(3)\quad bR_1=aR_2$$
$$(4)\quad R_3=R_2 \tan \alpha$$
$$(5)\quad F_1=F_2 \tan \beta'$$

where $F_1$ is the spring force component normal to the beam; $R_1$ is the reaction force of the pin 46 normal to the beam; $R_2$ is the component normal to the beam of reaction force R of the drum 34; $\alpha$ is the smaller angle between the beam and the tangent 63 to the drum at the point of engagement of beam and drum, the reaction force R being normal to this tangent; and $a$ and $b$ are the moment arms of the forces $R_2$ and $R_1$, respectively, about the pin 56 by which the spring is attached to the beam. Solving the above equations for $\beta'$ gives $$(6)\quad \beta'=\arctan \frac{a+b}{b \tan \alpha}$$

it follows therefore, that the non-equilibrium condition that produces the action desired, i.e., constant urging of the arm toward the right, exists only when $$(7)\quad 180° > \beta > \arctan \frac{a+b}{b \tan \alpha}$$

where $\beta$ is the actual angle of inclination of the actual spring force 62 as shown in the figure. For satisfactory operation, the angle $\beta$ must conform to the conditions of Equation 7 in all of the engaged positions of the arm 41 with the brake drum 34.

Figure 5:
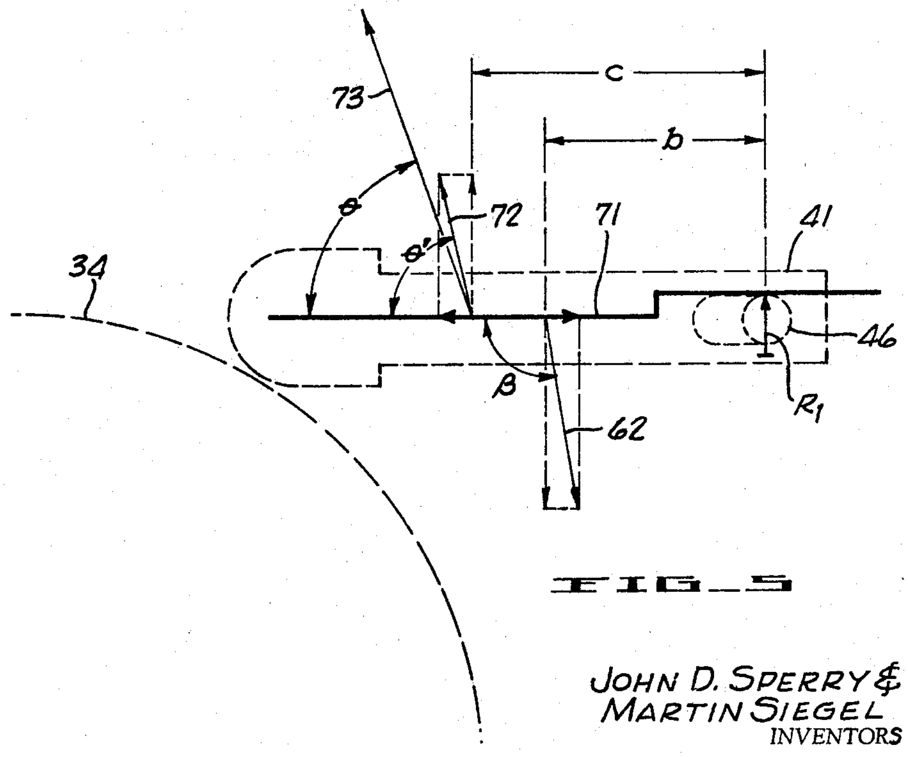
FIGURE 5 is a schematic view further illustrating the operation of the apparatus of FIGURE 2.

In the disengaged position, the angle of the link member 51 to the arm 41 also has critical limits, illustrated in FIGURE 5. In this figure, the arm 41 is represented by a schematic beam 71, which is in equilibrium when it will slide neither to the right nor to the left on pin 46, though free to do so. Spring force 62 makes angle $\beta$ with beam 71, the angle $\beta$ opening toward drum 34, as previously defined. The moment arm $b$ is as previously defined, and $c$ is the moment arm between pin 46 and the pin 53 by which the link member 51 is attached to the beam. The equilibrium direction of the link member force is represented by vector 72, making an angle $\theta'$ with the beam, angle $\theta'$ opening toward drum 34. Other force components are illustrated. Following a procedure similar to that used for deriving the equation for $\beta'$, it is found that $$(8)\quad \theta'=\arctan \left(-\frac{b}{c} \tan \beta\right)$$

and it follows that, to ensure that in the disengaged position the arm 41 is urged fully to the left on pin 46, the link member 51 must be arranged so that $$(9)\quad \theta<\arctan \left(-\frac{b}{c} \tan \beta\right)$$

In actual practice, the angles $\beta$ and $\theta$ must also be sufficiently greater and smaller than the arc tangents of Equations 7 and 9, respectively, to enable the spring force to overcome the frictional sliding resistance of the arm 41 and pin 46, and of the drum 34 on its bearings.

Thus there has been described a structure in which the reels are brought to a halt by operation of reel drive motors or stopping brakes such as are known in the art, and the brakes of the invention are then applied in such a way as first to induce a limited differential movement of the reels (i.e., each in the unwinding direction) to slacken the tape therebetween, and then to lock the reels in their new positions for the duration of the halt. Thus the slackened tape is kept out of tensioned frictional engagement with the rotating heads of the scanning assembly during the halt, but the reels are locked against unlimited loosening of the tape, so that tangling is avoided, and so that the tape is held ready for immediate resumption of operation. The parking brakes are also constructed so as to be operable as "fail-safe" stopping brakes in the event of power failure.

What is claimed is:

1. A reel brake comprising:
- a base on which said reel is mounted for rotation;
- a brake drum coupled to said reel for rotation therewith;
- a pivot pin mounted on said base in spaced relation to said drum;
- a brake shoe in the form of an arm provided with a longitudinal slot defining a pair of parallel bearing surfaces and mounted thereby for pivoting and lengthwise sliding of said surfaces on said pin, said arm extending from said pin toward said drum in the winding direction of said reel;
- said arm having a retracted position with said pin engaging the end of said slot remotest from said drum and the extending end of said arm pivoted slightly away from said drum, a first limiting position of engagement with said drum with said pin engaging said end of said slot remotest from said drum, and a second limiting position of engagement with said drum with said pin engaging the end of said slot closest to said drum;
- means coupled to said arm for moving said end of said arm in said winding direction of said reel and away from said drum to said retracted position of said arm, and for releasably holding said arm in said retracted position, said means including a solenoid mounted on said base and having a plunger coupled to said arm and an energized position corresponding to said retracted position of said arm; and
- a tension spring having one end coupled to said arm and the other end extending from said arm in the unwinding direction of said reel and anchored to said base, the line of urging of said spring on said arm being inclined toward said drum and defining an angle $\beta$ of inclination with respect to the plane of one of said bearing surfaces, said angle $\beta$ opening toward said drum and being chosen so that in all of the engaged positions of said drum and arm $$180° > \beta > \arctan \frac{a+b}{b \tan \alpha}$$

where $\alpha$ is the lesser dihedral angle between said plane and a plane tangential to said drum at the point of engagement of said arm and drum, $a$ is the moment arm between said point and the point of coupling of said spring to said arm, and $b$ is the moment arm between said last-named point and the point of engagement of said arm and pin.

2. A reel brake comprising:

a base on which said reel is mounted for rotation;

a brake drum coupled to said reel for rotation therewith;

a pivot pin mounted on said base in spaced relation to said drum;

a brake shoe in the form of an arm provided with a longitudinal slot defining a pair of parallel bearing surfaces and mounted thereby for pivoting and lengthwise sliding of said surfaces on said pin, said arm extending from said pin toward said drum in the winding direction of said reel;

said arm having a retracted position with said pin engaging the end of said slot remotest from said drum and the extending end of said arm pivoted slightly away from said drum, a first limiting position of engagement with said drum with said pin engaging said end of said slot remotest from said drum, and a second limiting position of engagement with said drum with said pin engaging the end of said slot closest to said drum;

a tension spring having one end coupled to said arm and the other end extending from said arm in the unwinding direction of said reel and anchored to said base, the line of urging of said spring on said arm being inclined toward said drum and defining an angle $\beta$ of inclination with respect to the plane of one of said bearing surfaces, said angle $\beta$ opening toward said drum and being chosen so that in all of the engaged positions of said drum and arm $$180° > \beta > \arctan \frac{a+b}{b \tan \alpha}$$

where $\alpha$ is the lesser dihedral angle between said plane and a plane tangential to said drum at the point of engagement of said arm and drum, $a$ is the moment arm between said point and the point of coupling of said spring to said arm, and $b$ is the moment arm between said last-named point and the point of engagement of said arm and pin; and means coupled to said arm for moving said end of said arm in said winding direction of said reel and away from said drum to said retracted position of said arm, and for releasably holding said arm in said retracted position, said means including a solenoid mounted on said base and having a plunger coupled to said arm and an energized position corresponding to said retracted position of said arm;

the coupling between said plunger and arm including a link member coupled to said arm and plunger for free rotation with respect to each, said link member being inclined to the length of said arm with the angle $\beta$ between said link member and arm opening toward said drum and in the winding direction of said reel, said angle $\beta$ being chosen so that in said retracted position of said arm $$\theta < \arctan \left(-\frac{b}{c} \tan \beta\right)$$

where $c$ is the moment arm between said pin and the point of attachment of said link member to said arm.

3. A reel brake as characterized in claim 2, in which said solenoid is positioned on the side of said arm corresponding to the winding direction of said reel.

4. A reel brake as characterized in claim 2, in which the inclinations of said link member and spring to said arm and bearing surface plane respectively are sufficiently small and sufficiently great respectively to develop force resultants overcoming the frictional rotational resistance of said drum and the frictional sliding resistance of said arm with respect to said pin.

5. A braking apparatus for a pair of reels, comprising:

a base on which said reels are mounted for rotation;

a brake drum coupled to each of said reels for rotation therewith;

a pair of pivot pins each mounted on said base in spaced relation to a respective one of said drums;

a pair of brake shoes each in the form of an arm provided with a longitudinal slot defining a pair of parallel bearing surfaces and mounted thereby for pivoting and lengthwise sliding motion of said surfaces on a respective one of said pins, each of said arms extending from said respective pin toward the respective drum in the winding direction of said respective reel;

each of said arms having a retracted position with said respective pin engaging the end of said respective slot remotest from said respective drum and the extending end of said arm pivoted slightly away from said respective drum, a first limiting position of engagement with said respective drum with said respective pin engaging said end of said respective slot remotest from said respective drum, and a second limiting position of engagement with said respective drum with said respective pin engaging the end of said respective slot closest to said respective drum;

a pair of tension springs each having one end coupled to said respective arm and the other end extending from said respective arm in the unwinding direction of said respective reel and anchored to said base, the line of urging of said respective spring on said respective arm being inclined toward said respective drum and defining an angle $\beta$ of inclination with respect to the plane of one of said respective bearing surfaces, said angle $\beta$ opening toward the respective drum and being chosen so that, in all of the engaged positions of said respective drum and arm $$180° > \beta > \arctan \frac{a+b}{b \tan \alpha}$$

where $\alpha$ is the lesser dihedral angle between said respective plane and a plane tangential to said respective drum at the point of engagement of said respective arm and drum, $a$ is the moment arm between said respective point and the point of coupling of said respective spring to said respective arm, and $b$ is the moment arm between said respective last-named point and the point of engagement of said respective arm and pin; and means coupled to each of said arms for moving said end of said respective arm in said winding direction of said respective reel and away from said respective drum to said retracted position of said respective arm, and for releasably holding said respective arm in said retracted position, each of said means including a solenoid mounted on said base and having a plunger coupled to said respective arm and an energized position corresponding to said retracted position of said respective arm;

the coupling between each of said plungers and arms including a link member coupled to said respective arm and plunger for free rotation with respect to each, each of said link members being inclined to the length of said respective arm with the angle $\theta$ between said respective link member and arm opening toward said drum and in the winding direction of said respective reel, said angle $\theta$ being chosen so that in said retracted position of said respective arm $$\theta < \arctan\left(-\frac{b}{c}\tan\beta\right)$$

where $c$ is the moment arm between said respective pin and the point of attachment of said respective link member to said respective arm.

References Cited by the Examiner

UNITED STATES PATENTS

| | | | |
|---|---|---|---|
| 1,772,869 | 8/1930 | Le Roy | 188—82.7 |
| 1,922,635 | 8/1933 | Post | 188—82.3 |
| 2,274,281 | 2/1942 | Stinson | 188—82.3 X |
| 2,923,380 | 2/1960 | Selsted et al. | 242—55.12 X |
| 2,962,237 | 11/1960 | Loewe | 242—55.12 |

FRANK J. COHEN, *Primary Examiner.*

GEORGE F. MAUTZ, *Examiner.*